(12) United States Patent
Sakurai et al.

(10) Patent No.: US 11,600,052 B2
(45) Date of Patent: Mar. 7, 2023

(54) IMAGE DISPLAY SYSTEM

(71) Applicant: TOYOTA JIDOSHA KABUSHIKI KAISHA, Toyota (JP)

(72) Inventors: Hideyuki Sakurai, Toyota (JP); Nobuhiro Nakano, Nagakute (JP); Kazuhisa Maeda, Toyota (JP); Yohei Tanigawa, Toyota (JP); Keisuke Itou, Tokyo (JP); Kantarou Shinma, Tokyo (JP); Nobuki Hayashi, Nisshin (JP); Tetsuro Sakaguchi, Toyota (JP); Yukari Ogawa, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/548,627

(22) Filed: Dec. 13, 2021

(65) Prior Publication Data

US 2022/0198759 A1  Jun. 23, 2022

(30) Foreign Application Priority Data

Dec. 18, 2020  (JP) .............................. JP2020-209873

(51) Int. Cl.
  *G06T 19/00*  (2011.01)
  *H04N 7/18*  (2006.01)
(52) U.S. Cl.
  CPC .......... *G06T 19/006* (2013.01); *H04N 7/183* (2013.01)
(58) Field of Classification Search
  None
  See application file for complete search history.

(56) References Cited

U.S. PATENT DOCUMENTS

| 10,052,026 | B1* | 8/2018 | Tran ....................... A61B 5/165 |
| 2005/0073531 | A1 | 4/2005 | Kuroki et al. |
| 2017/0053456 | A1* | 2/2017 | Cho ........................ G06F 1/163 |
| 2017/0330380 | A1* | 11/2017 | Ahn .......................... G06F 3/16 |
| 2018/0253840 | A1* | 9/2018 | Tran ....................... G16H 40/63 |
| 2019/0130652 | A1* | 5/2019 | Yu ......................... G06T 19/006 |
| 2019/0191850 | A1* | 6/2019 | Yoganandan ....... B26B 21/4056 |
| 2020/0193713 | A1* | 6/2020 | Wagner ................. H04L 67/131 |
| 2022/0192346 | A1* | 6/2022 | Mouizina ............... H04N 5/272 |

FOREIGN PATENT DOCUMENTS

JP  2005-108108 A  4/2005

OTHER PUBLICATIONS

Davids, "Snap Camera—Use Snapchat Filters With Your Webcam," Dec. 18, 2020, YouTube, URL: https://www.youtube.com/watch7v=eGjOANDcpG0 (Year: 2020).*

* cited by examiner

*Primary Examiner* — David H Chu
(74) *Attorney, Agent, or Firm* — Oliff PLC

(57) ABSTRACT

In an image display system that is equipped with a camera that images a figure of a visitor of a theme park in front of a mirror device and a background, a server that processes an image of the visitor imaged by the camera and that generates display data, and a display device that displays the display data generated by the server on the mirror device, the server includes a database that stores image data on a character, and generates the display data after replacing part of the image of the visitor imaged by the camera with part of an image of the character selected by the visitor with reference to the database.

4 Claims, 4 Drawing Sheets

IMAGE DISPLAY SYSTEM

CROSS-REFERENCE TO RELATED APPLICATION

This application claims priority to Japanese Patent Application No. 2020-209873 filed on Dec. 18, 2020, incorporated herein by reference in its entirety.

BACKGROUND

1. Technical Field

The disclosure relates to an image display system, more particularly, to an image display system that displays part of the figure of a visitor of a predetermined area reflected on a mirror device, as part of the figure of a character.

2. Description of Related Art

Recently, an art that makes a person fitted with a head-mounted display (hereinafter referred to as the HMD) feel as if he or she were handling a real camera when handling a mock-up camera in the HMD with an image imaged by a three-dimensional CG camera superimposed on an image imaged by the mock-up camera through the use of mixed reality technology has been in use (e.g., see Japanese Unexamined Patent Application Publication No. 2005-108108 (JP 2005-108108 A)).

SUMMARY

By the way, various tourist facilities have recently been constructed. In a predetermined area such as a tourist facility, it is important that visitors enjoy themselves and then visit the area many more times afterwards. For example, the sense of unity with a character of an attraction is enhanced by making a visitor of the predetermined area such as the tourist facility feel as if he or she were spending time with the character. As a result, it is possible to ensure that the visitor finds the predetermined area more enjoyable. However, the art described in JP 2005-108108 A is not closely associated with the predetermined area such as the tourist facility, and has been difficult to apply directly to the predetermined area such as the tourist facility.

It is thus an object of the disclosure to make a visitor of a predetermined area feel united with a character.

An image display system of the disclosure is an image display system that is equipped with a camera that images a figure of a visitor of a predetermined area in front of a mirror device and a background, a server that processes an image of the visitor imaged by the camera and that generates display data, and a display device that displays the display data generated by the server on the mirror device. The server includes a database that stores image data on a character, and generates the display data after replacing part of the image of the visitor imaged by the camera with part of an image of the character selected by the visitor with reference to the database.

Thus, when looking at the mirror device, the visitor of the predetermined area such as a tourist facility sees himself or herself with part thereof, for example, his or her face turned into part of the character, for example, a face of the character. Therefore, the visitor can be made to feel as if he or she had disguised himself or herself into the character. Thus, it is possible to ensure that the visitor feels united with the character and finds the predetermined area such as the tourist facility more enjoyable. As a result, the number of his or her revisits to the predetermined area in the future can be increased.

In the image display system of the disclosure, the server may generate projection data on a shadow of the character selected by the visitor, based on the image of the visitor and the database, and the image display system may be equipped with a projection device that projects the projection data generated by the server onto a floor while superimposing the projection data on the shadow of the visitor.

In this manner, by turning the shadow of the visitor into the shadow of the character, the visitor can be made to feel more keenly as if he or she had disguised himself or herself into the character and find the predetermined area such as the tourist facility more enjoyable.

In the image display system of the disclosure, the camera may image an image of a space in front of the mirror device, and the server may cause the display device to display the display data on the mirror device, and project the projection data onto the floor while superimposing the projection data on the shadow of the visitor, upon recognizing the image of the visitor in the image of the space imaged by the camera.

Thus, when the visitor passes in front of the mirror device, the figure of the visitor with part thereof turned into part of the character is displayed on the mirror device, and the shadow of the character is projected onto the floor. Therefore, the visitor can be made to feel as if he or she has disguised himself or herself into the character. Thus, the visitor can be made to feel united with the character and find the predetermined area such as the tourist facility more enjoyable. As a result, the number of his or her revisits to the predetermined area in the future can be increased.

In the image display system of the disclosure, the server may generate the display data while changing the image of the character into an image of a grown-up version of the character, as the visitor walks in the predetermined area.

Besides, in the image display system of the disclosure, the server may generate the projection data while changing the shadow of the character in such a manner as to correspond to the grown-up version of the character, as the visitor walks in the predetermined area.

Thus, the visitor can be made to feel united with the character. As a result, the number of his or her revisits to the predetermined area in the future can be increased.

The disclosure can make the visitor of the predetermined area feel united with the character.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An image display system 100 of one of the embodiments will be described hereinafter with reference to the drawings.

Figure 1:
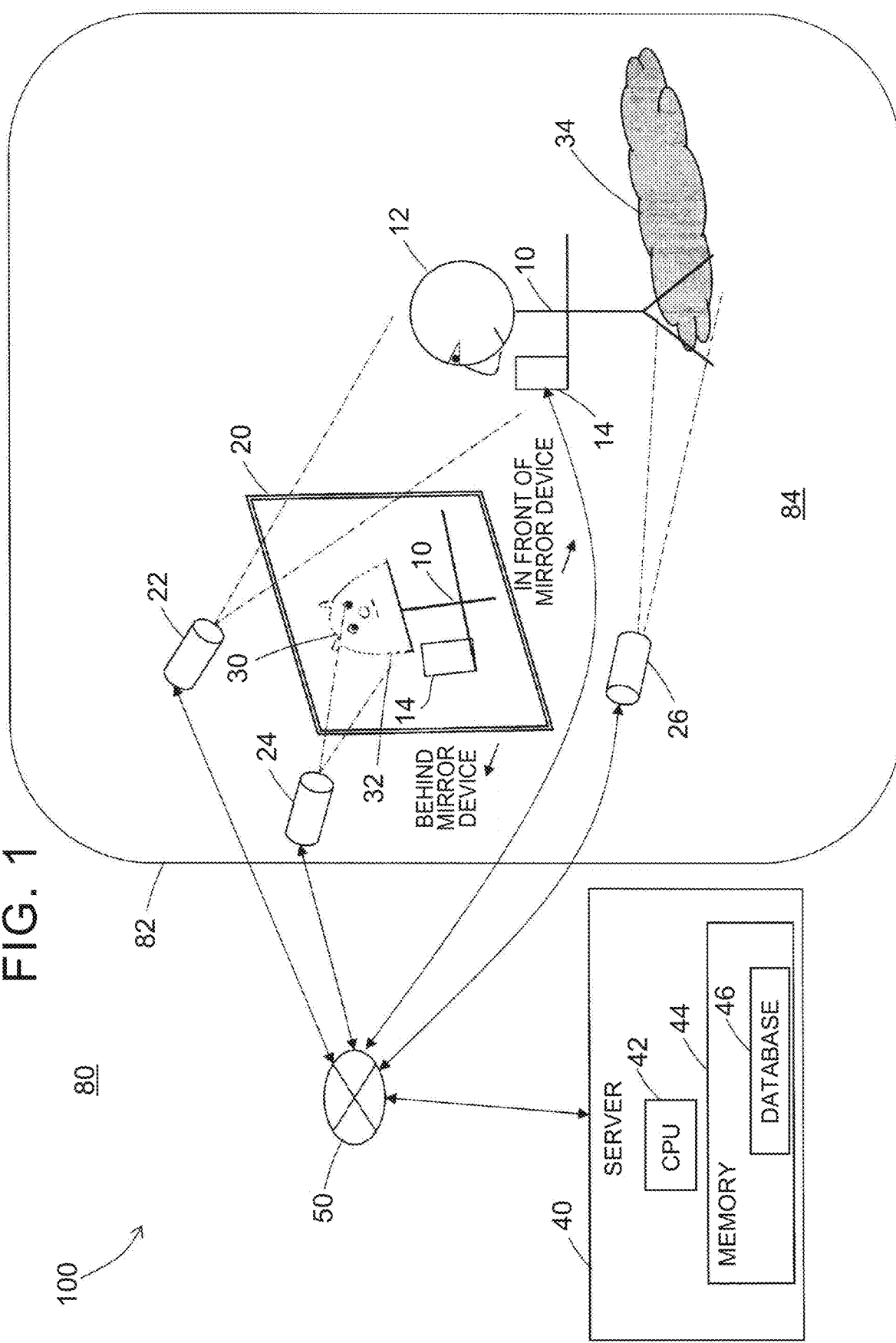
FIG. 1 is a systematic diagram showing the configuration of an image display system of one of the embodiments.

In the following description, a case where the image display system 100 is applied to a theme park 80 will be described. As shown in FIG. 1, the image display system 100 is constituted of a mirror device 20, a camera 22, a display device 24, a projection device 26, and a server 40. The mirror device 20, the camera 22, the display device 24, and the projection device 26 are connected to the server 40 via a communication line 50 such as the Internet or a telephone line.

The mirror device 20, the camera 22, the display device 24, and the projection device 26 are provided in a facility 82 where an attraction is held, in the theme park 80. It should be noted herein that the theme park 80 is a tourist facility in which a whole picture is staged based on a specific theme such as culture, nation, story, cinema, or era. Besides, the attraction is an event in which a scene of a specific movie or the like is staged and a visitor 10 feels united with a character 30 appearing in the movie.

The mirror device 20 is attached to a wall surface of a building of the facility 82. For example, the mirror device 20 is attached to a wall surface or the like of a hand-wash station of a toilet in the building. The mirror device 20 usually functions as a mirror, and reflects light coming from a space in front thereof. When someone looks at the mirror device 20 from the space in front thereof, he or she can see his or her face and the like reflected on the mirror device 20. However, when an image is projected from a display device 24 that will be described later toward a rear surface of the mirror device 20, the mirror device 20 does not reflect light coming from the space in front thereof like a mirror. Instead, the image projected from behind penetrates the mirror device 20, and is radiated forward of the mirror device 20. Accordingly, when the display device 24 is in operation, only a display image projected onto the rear surface of the mirror device 20 by the display device 24 is visible from the space in front of the mirror device 20.

The camera 22 is arranged close to the mirror device 20 to image an image of the space in front of the mirror device 20. When the visitor 10 of the theme park 80 stands in front of the mirror device 20, the camera 22 images a figure of the visitor 10 in front of the mirror device 20 and a background.

The display device 24 is arranged behind the mirror device 20. The display device 24 is an image projector that projects display data generated by the server 40 from behind the mirror device 20 onto the rear surface of the mirror device 20.

The projection device 26 is arranged in front of the mirror device 20. The projection device 26 is an image projector that projects projection data generated by the server 40 onto a floor 84 of the facility 82.

The server 40 is a computer that is equipped therein with a CPU 42 that is a processor for performing information processing, and a memory 44 in which programs, operation data, and the like are stored. A database 46 is stored in the memory 44. Image data on the character 30 are stored in the database 46.

The visitor 10 carries a portable terminal 14 that is connected to the server 40 via the communication line 50. The portable terminal 14 transmits positional information to the server 40.

Next, the operation of the image display system 100 of the embodiment will be described with reference to FIGS. 2 to 5.

Figure 2:
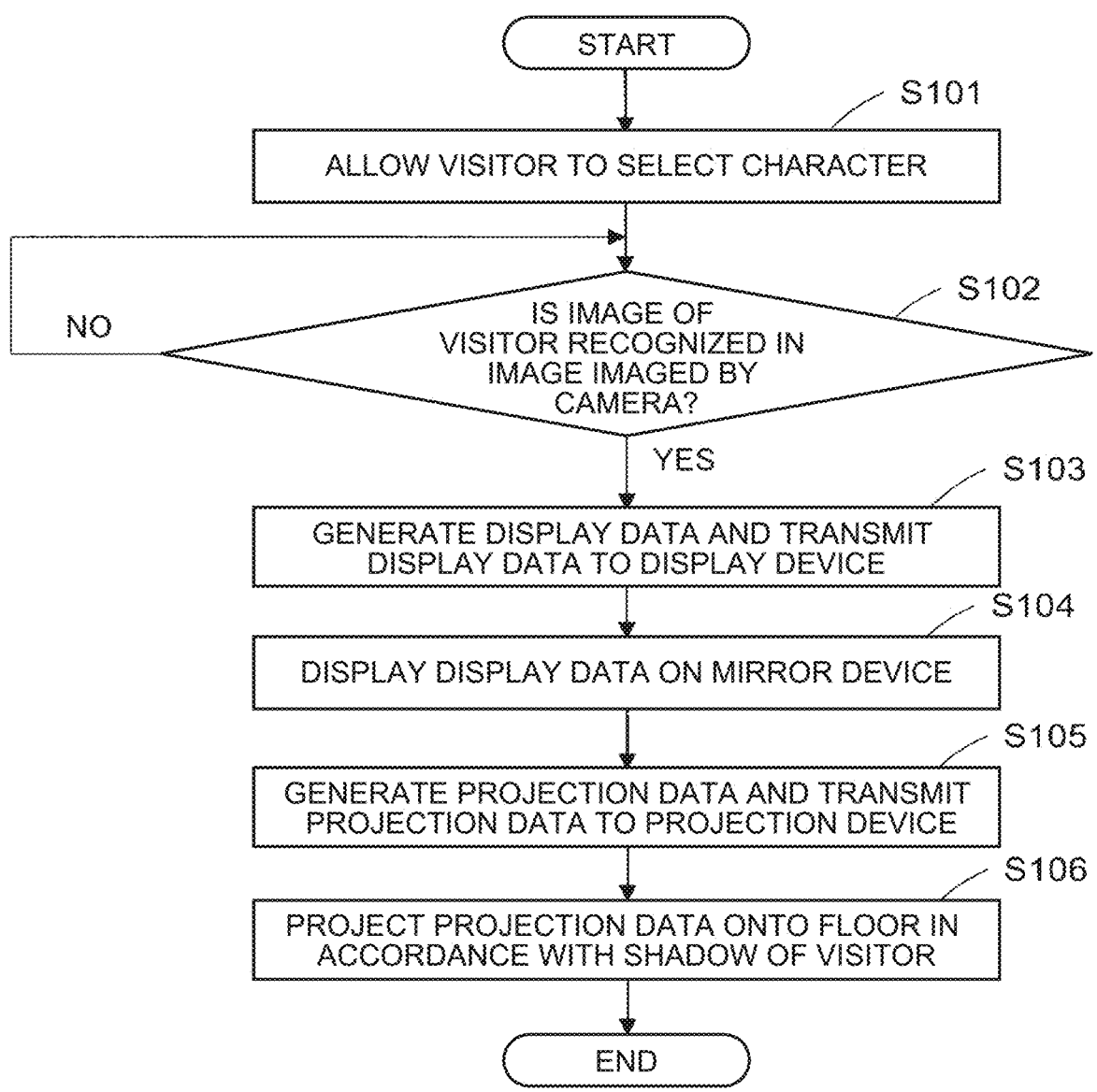
FIG. 2 is a flowchart showing the operation of the image display system of the embodiment.

As indicated by step S101 in FIG. 2, upon entering the theme park 80, the visitor 10 selects the character 30 into whom he or she wishes to disguise himself or herself, and transmits the selected character from the portable terminal 14 to the server 40. Besides, the portable terminal 14 carried by the visitor 10 also transmits positional information to the server 40.

The camera 22 images an image 23 of the space in front of the mirror device 20 and transmits the image to the server 40. In step S102 of FIG. 2, the server 40 stands by until recognizing an image of the visitor 10 in the image 23 (see FIG. 3) imaged by the camera 22. It should be noted herein that the image of the visitor 10 is recognized, for example, as follows.

Figure 3:
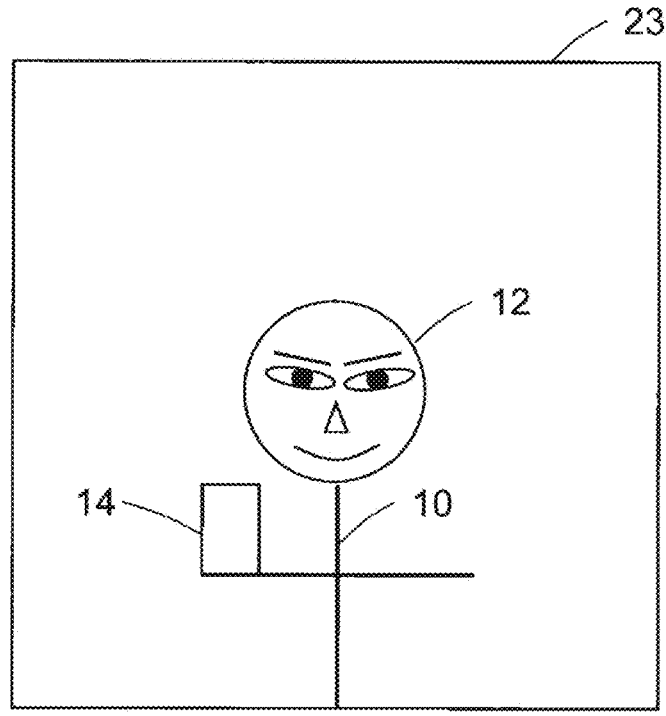
FIG. 3 is a view showing an image imaged by a camera.

The server 40 recognizes the image 23 transmitted from the camera 22, and determines whether or not a human figure is recognized in the image 23 as shown in FIG. 3. When a human figure is recognized, the server 40 identifies a position of the human figure from the image 23 of the camera 22. Then, when the position of the human figure and the positional information on the portable terminal 14 of the visitor 10 coincide with each other, the server 40 recognizes the human figure as the visitor 10.

The visitor 10 walks around in the theme park 80, and enters the facility 82 in which the attraction is held. Then, when the visitor 10 stands in the space in front of the mirror device 20 installed in the facility 82, the server 40 recognizes a human figure in the image 23 transmitted from the camera 22, recognizes the human figure as the visitor 10 from the positional information on the portable terminal 14 according to the method described above, determines that the result of the determination in step S102 of FIG. 2 is YES, and proceeds to step S103 of FIG. 2.

The server 40 generates display data in step S103 of FIG. 2, and transmits the generated display data to the display device 24. The display data are generated as follows.

The image 23 received from the camera 22 by the server 40 includes the figure of the visitor 10 and the background. The server 40 generates a display image 25 shown in FIG. 4 after replacing a face 12 that is part of the image of the figure of the visitor 10 with a face 32 of the character 30 selected by the visitor 10 in step S101 of FIG. 2, with reference to the database 46 in which the image of the character 30 is stored. The server 40 then transmits image data on the display image 25 to the display device 24 as display data.

Figure 4:
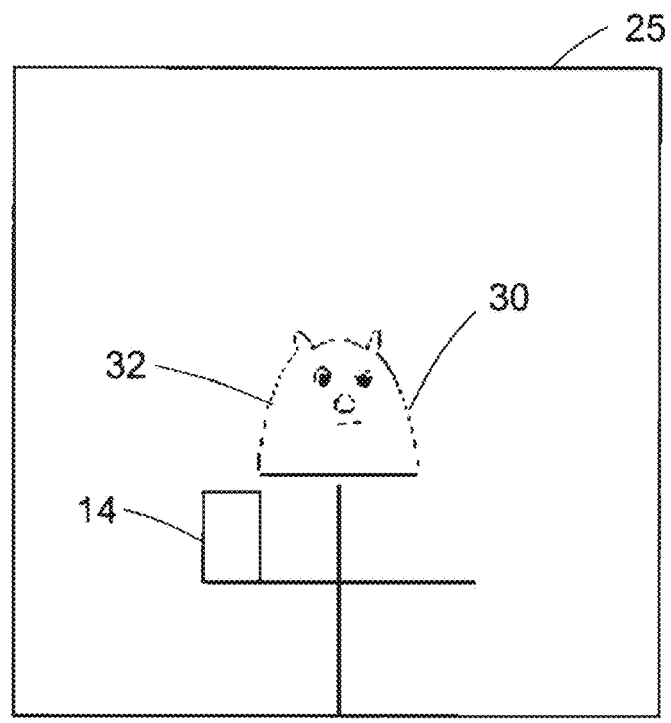
FIG. 4 is a view showing an image of display data generated by a server.
Figure 5:
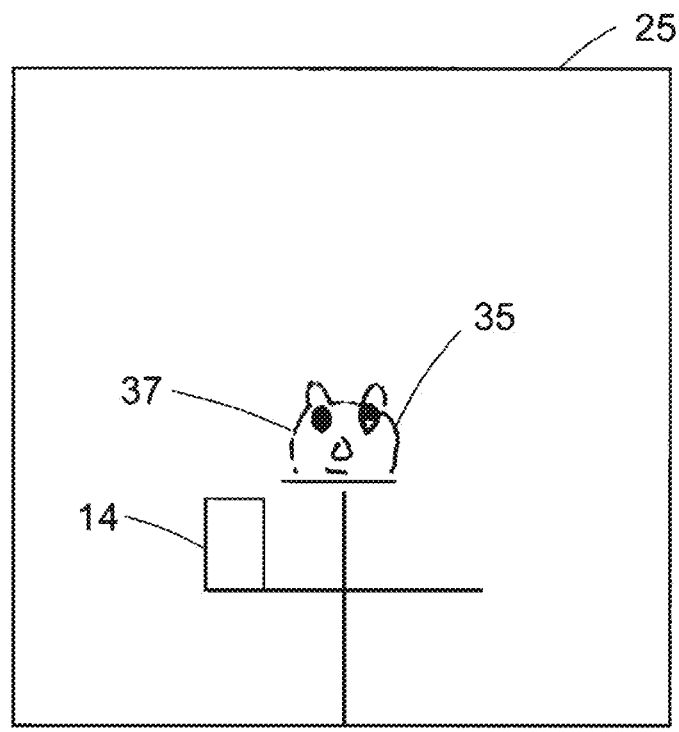
FIG. 5 is a view showing an image of other display data generated by the server.

In step S104 of FIG. 2, upon receiving the display data from the server 40, the display device 24 projects the data toward the mirror device 20. Thus, the display image 25 shown in FIG. 4 is projected onto the rear surface of the mirror device 20. The projected display image 25 penetrates the mirror device 20, and is radiated forward of the mirror device 20. In this case, the mirror device 20 does not reflect the light coming from the space in front thereof, and only the display image 25 projected by the display device 24 is visible from the space in front of the mirror device 20. Therefore, as shown in FIG. 1, when the visitor 10 looks into the mirror device 20, the visitor 10 sees his or her own face 12 turned into the face 32 of the character 30, in the mirror device 20. Thus, the visitor 10 feels as if he or she had disguised himself or herself into the character 30.

Besides, the server 40 generates projection data in step S105 of FIG. 2, and transmits the generated projection data to the projection device 26. The projection data are generated as follows.

The server 40 extracts a region of the shadow of the visitor 10 on the floor 84 of the facility 82 from the image 23 imaged by the camera 22. The server 40 then acquires the image data on the character 30 selected by the visitor 10 from the database 46, and generates projection data for projecting such a shadow 34 as to precisely cover the shadow of the visitor 10 onto the floor 84, based on the acquired image data. The server 40 then transmits the generated projection data to the projection device 26.

In step S106 of FIG. 2, the projection device 26 projects the shadow 34 onto the floor 84 in accordance with the position of the shadow of the visitor 10, based on the projection data received from the server 40. For example, the projection device 26 may light up an area around the shadow 34 so that the shadow 34 is visible on the floor 84.

As described previously, the display device 24 displays the figure of the visitor 10 with his or her face 12 turned into the face 32 of the character 30, on the mirror device 20. Besides, the shadow 34 of the character 30 is projected onto the floor 84 at the feet of the visitor 10. Thus, the visitor 10 feels as if he or she had disguised himself or herself into the character 30, feels united with the character 30, and finds the theme park 80 more enjoyable. Thus, the number of his or her revisits to the theme park 80 in the future can be increased.

The movie in which the character 30 appears may depict a situation where the character 30 grows step by step. In this case, the image of the character 30 in the display data may be changed into an image of a grown-up version of the character 30, as the visitor 10 walks around in the theme park 80. For example, immediately after the visitor 10 enters the theme park 80, the face 12 of the visitor 10 is replaced with a face 37 of a child character 35 during the childhood of the character 30 in generating the display data. Then, as the visitor 10 walks around, the face 12 of the visitor 10 may be replaced with the face 32 of the adult character 30.

In this manner, when the image of the character 30 is changed into the image of the grown-up version of the character 30, the projection data may be changed in such a manner as to project the shadow 34 corresponding to the level of growth of the character 30, in generating the projection data. For example, when the face 12 of the visitor 10 is replaced with the face 37 of the child character 35 in generating the display data, the projection data may be generated such that the shadow 34 shortens, in such a manner as to correspond to the child character 35.

Thus, the visitor 10 can be made to feel united with the character 30 and find the theme park 80 enjoyable. As a result, the number of his or her revisits to the theme park 80 in the future can be increased.

The foregoing description has been given on the assumption that the sever 40 generates the display data with the face 12 of the visitor 10 replaced with the face 32 of the character 30, but the disclosure is not limited thereto. For example, the face 12 and hair of the visitor 10 may be replaced with the face 32 and hair of the character 30, and in addition, the torso of the visitor 10 may be replaced with the torso of the character 30.

Besides, in accordance with the situation where the character 30 grows, the clothes of the character 30 may be changed, or the weapon and the like carried by the character 30 may be changed.

The foregoing description has been given on the assumption that the image display system 100 is equipped with the projection device 26. However, the image display system 100 may not be equipped with the projection device 26.

Besides, the display device 24 has been described as an image projector that displays the display data generated by the server 40 while projecting the display data onto the rear surface of the mirror device 20, but the disclosure is not limited thereto. For example, the mirror device 20 may be configured as a mirror-type display, and may be caused to display the display image 25 shown in FIG. 4.

Besides, the mirror device 20 has been described on the assumption that the mirror device 20 usually functions as a mirror to reflect the light coming from the space in front thereof, and that the image penetrates the mirror device 20 and is radiated to the space in front of the mirror device 20 when projected onto the mirror device 20 from the display device 24 arranged behind the mirror device 20, but the disclosure is not limited thereto. For example, the mirror device 20 may be a window functioning as a reflector. The window functioning as the reflector may be configured in such a manner as to usually function as a window that is penetrated by at least part of light and that reflects the figure of the visitor himself or herself while reflecting part of the light, and such that an image penetrates the window and is radiated forward when projected onto the window from the display device 24 arranged behind the window. Thus, in the case where the image is a face image of the character 30, when the visitor 10 looks into his or her own figure reflected on the window functioning as the reflector, the face image of the character 30 projected from the display device 24 penetrates the window and is radiated forward, and the visitor 10 sees himself or herself with his or her face turned into the face of the character 30 in the window. As a result, the visitor 10 can feel as if he or she had disguised himself or herself into the character 30.

The case where the image display system 100 is applied to the theme park 80 has been described above. However, the image display system 100 is also applicable to predetermined areas other than the theme park 80. For example, the image display system 100 may be applied to a movie theater to display a character of a movie shown there. Besides, the image display system 100 may be applied to an event venue to display a character appearing in an event that is being held.

What is claimed is:

1. An image display system comprising:
    a camera configured to image a figure of a visitor of a predetermined area in front of a mirror device and a background;
    a server configured to process an image of the visitor imaged by the camera and generate display data; and
    a display device configured to display the display data generated by the server on the mirror device, wherein
    the server includes a database that stores image data on a character, and is configured to generate the display data after replacing part of the image of the visitor imaged by the camera with part of an image of the character selected by the visitor with reference to the database,
    the server is configured to generate projection data on a shadow of the character selected by the visitor, based on the image of the visitor and the database, and
    a projection device is configured to project the projection data generated by the server onto a floor while superimposing the projection data on the shadow of the visitor is provided.

2. The image display system according to claim 1, wherein
    the camera is configured to image an image of a space in front of the mirror device, and
    the server is configured to cause the display device to display the display data on the mirror device, and project the projection data onto the floor while superimposing the projection data on the shadow of the visitor, upon recognizing the image of the visitor in the image of the space imaged by the camera.

3. The image display system according to claim 2, wherein
the server is configured to generate the display data while changing the image of the character into an image of a grown-up version of the character, as the visitor walks in the predetermined area.

4. The image display system according to claim 3, wherein
the server is configured to generate the projection data while changing the shadow of the character in such a manner as to correspond to the grown-up version of the character, as the visitor walks in the predetermined area.

\* \* \* \* \*